F. G. LYNDE.
PEDAL MECHANISM FOR PNEUMATIC PIANO PLAYERS.
APPLICATION FILED FEB. 7, 1913.
1,108,452.
Patented Aug. 25, 1914.
2 SHEETS—SHEET 2.
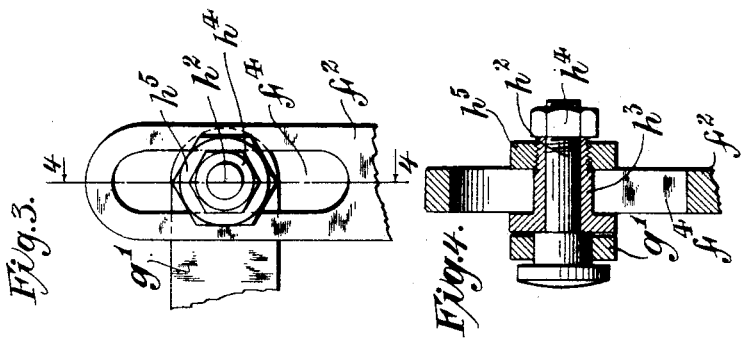
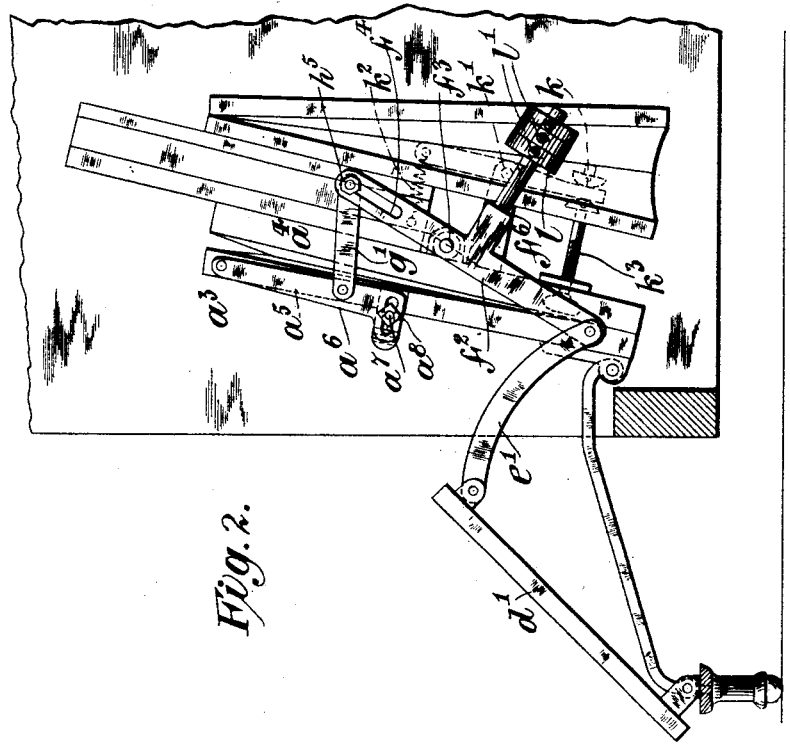
WITNESSES
INVENTOR
Frank G. Lynde
BY
Redding Greeley + Goodlett
ATTORNEYS

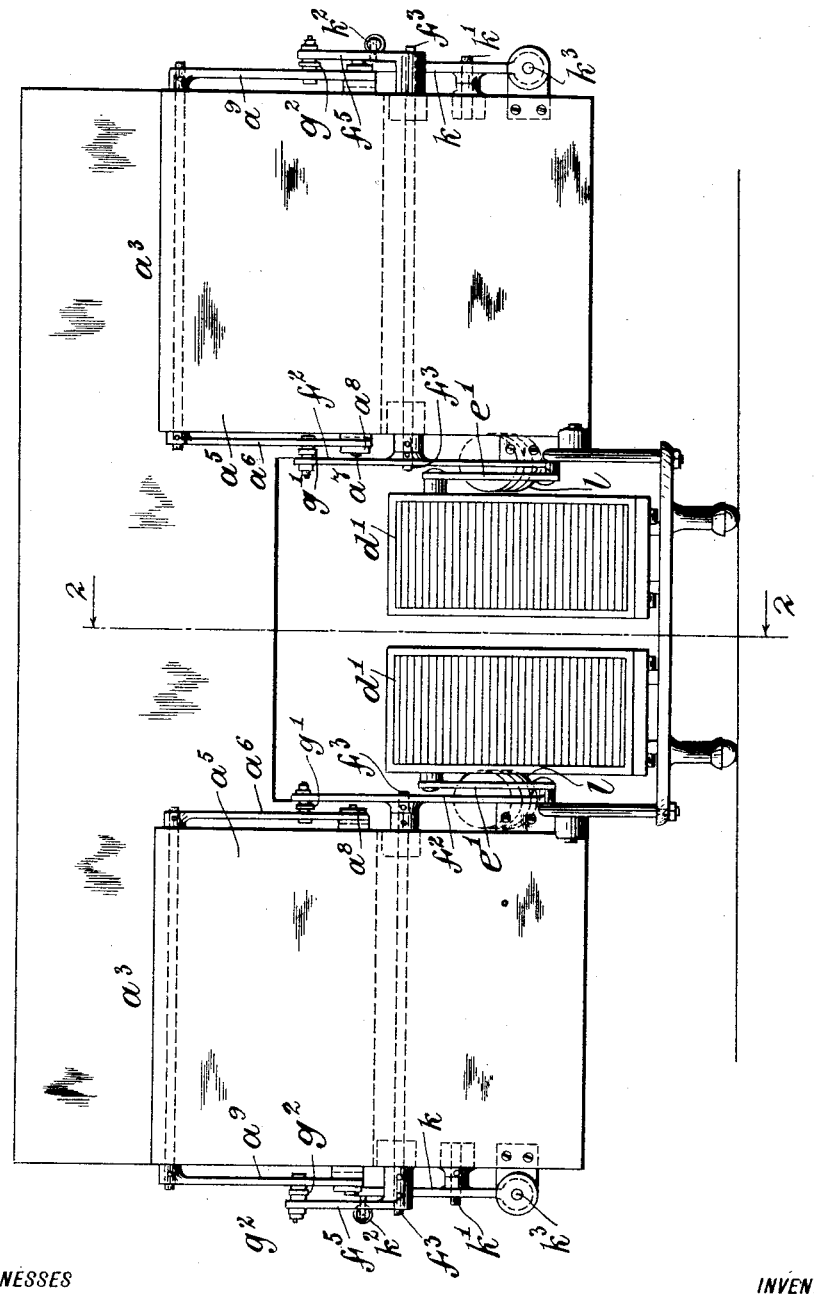

UNITED STATES PATENT OFFICE.

FRANK G. LYNDE, OF NEWARK, NEW JERSEY, ASSIGNOR TO LAUTER CO., OF NEWARK, NEW JERSEY, A CORPORATION OF NEW JERSEY.

PEDAL MECHANISM FOR PNEUMATIC PIANO-PLAYERS.

1,108,452. Specification of Letters Patent. Patented Aug. 25, 1914.

Application filed February 7, 1913. Serial No. 746,712.

*To all whom it may concern:*

Be it known that I, FRANK G. LYNDE, a citizen of the United States, residing in Newark, Essex county, State of New Jersey, have invented certain new and useful Improvements in Pedal Mechanism for Pneumatic Piano-Players, of which the following is a specification, reference being had to the accompanying drawings, which form a part hereof.

This invention relates to the pumping or feed bellows operated by the feet of the performer for the purpose of exhausting air from the main bellows or equalizing reservoir.

The object of the invention is to improve the construction and operation of such feed bellows and especially to provide improved means whereby the effective movement of the bellows produced by a given movement of the operating pedal or whereby the movement of the operating pedal necessary to produce a given movement of the bellows can be varied to suit different instruments or different performers.

The invention will be more fully explained hereinafter with reference to the accompanying drawings in which two embodiments of the invention are illustrated and in which—

Figure 1 is a view in front elevation of a part of the feed bellows with their operating pedals and connections. Fig. 2 is a detail view in section on the plane indicated by the line 2—2 of Fig. 1 looking in the direction of the arrows. Figs. 3 and 4 are detail views of parts to be referred to.

The embodiment of the invention as illustrated in Figs. 1 and 2 includes a feeder bellows $a$, which has one member $a^4$ secured to a suitable support, and has its movable member $a^5$ hinged to the fixed member upon a horizontal line. The pedal $d'$ is connected by a link $e'$ with a lever $f^2$. The latter is pivoted as at $f^3$ and is connected at its opposite end by a link $g'$ with the movable member $a^5$ of the bellows, preferably through an arm $a^6$ which is pivoted upon the movable member of the bellows and is slotted at its other end for the passage of a threaded stud $a^7$ provided with a clamping nut $a^8$ so that adjustment of the connection between the link $g'$ and the movable member of the bellows can be effected. The link $g'$ is shown as pivotally connected to the movable member of the bellows and at its other end it is both pivotally and adjustably connected to the lever $f^2$ which is slotted as at $f^4$ to receive a stud $h^2$ which is mounted in the end of the link $g'$ and carries a bearing sleeve $h^3$. The stud $h^2$ is threaded and provided with a nut $h^4$ and the sleeve $h^3$ may also be threaded and provided with a nut $h^5$. Preferably the lever arm $f^2$ is secured to a shaft $f^3$ which at its opposite end is provided with a similar arm $f^5$, connected to the movable member of the bellows on that side through a link $g^2$ and, if desired, an adjusting arm $a^9$. The bellows is provided as usual with a collapsing spring. In order to permit the resistance of this spring to be regulated easily there may be provided an adjusting lever $k$, suitably pivoted as at $k'$ and connected at one end to the lever arm $f^2$ through a spring $k^2$. At its other end it has connected thereto an adjusting screw $k^3$, readily accessible, so that the tension of the spring $k^2$ may be adjusted so as to be varied more or less. It will now be understood that by shifting the stud $h^2$ toward the pivot of the lever $f^2$, a smaller movement of the movable member of the bellows will be produced by a given movement of the pedal and vice versa.

In Figs. 1 and 2 is indicated a supplemental closing means for the bellows, which may be employed either in conjunction with the spring $k^2$, or independently thereof. The supplemental closing means is gravity operated and comprises a weight $l$ adjustably secured to an arm $f^6$, which is preferably integral with and angularly disposed to the lever $f^2$. By means of a suitable set screw $l'$ the weight $l$ may be secured adjustably on the arm $f^6$ to vary the effective closing leverage. It will be understood that such a gravity closing means is invariable in operation and when employed in conjunction with a spring insures the operation of the bellows even though the spring becomes inactive.

I claim as my invention:—

1. A pedal mechanism comprising a pedal member, a swinging lever arm connected operatively to the pedal member, a second arm secured to the member actuated by the pedal and independent of the connection between the lever arm and the pedal member, and a slot and stud connection between said arms to permit their relative adjustment whereby for a given stroke of the pedal member the effective movement of the actuated member may be varied at the will of the operator.

2. A pedal mechanism comprising a pedal member, a swinging lever arm to which the pedal member is operatively connected, an adjustable slot and stud connection between the lever arm and the member actuated by the pedal, a second arm fixedly carried by the lever arm and angularly disposed thereto and a weight adjustably secured to said second arm and operative to return the actuated member to its normal position after displacement by the pedal member.

This specification signed and witnessed this 31st day of January A. D., 1913.

FRANK G. LYNDE.

Signed in the presence of—
E. M. TAYLOR,
WORTHINGTON CAMPBELL.

---

Copies of this patent may be obtained for five cents each, by addressing the "Commissioner of Patents, Washington, D. C."